United States Patent
Pescara et al.

(10) Patent No.: US 12,434,559 B1
(45) Date of Patent: Oct. 7, 2025

(54) SYSTEMS AND METHODS FOR DISCONNECTING VEHICLE AXLES

(71) Applicant: Dana Automotive Systems Group, LLC, Maumee, OH (US)

(72) Inventors: Anthony Pescara, Oregon, OH (US); Peter A. Beesley, Fort Wayne, IN (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/775,621

(22) Filed: Jul. 17, 2024

(51) Int. Cl.
*F16D 11/14* (2006.01)
*B60K 23/08* (2006.01)
*F16D 11/00* (2006.01)

(52) U.S. Cl.
CPC .............. *B60K 23/08* (2013.01); *F16D 11/14* (2013.01); *F16D 2011/002* (2013.01)

(58) Field of Classification Search
CPC .... B60K 23/08; F16D 11/14; F16D 2011/002
See application file for complete search history.

(56) References Cited

U.S. PATENT DOCUMENTS

| | | |
|---|---|---|
| 6,793,034 B2 | 9/2004 | Raftari et al. |
| 10,801,556 B2 | 10/2020 | Eschenburg et al. |
| 10,864,818 B2 * | 12/2020 | Eschenburg ........... B60K 17/36 |
| 2013/0068583 A1 * | 3/2013 | Eastman ................. F16D 27/14 192/69.4 |
| 2024/0198790 A1 * | 6/2024 | Suleimenov ............ F16D 28/00 |
| 2024/0246360 A1 * | 7/2024 | Palazzolo ............... B60B 35/18 |
| 2024/0418251 A1 * | 12/2024 | Lee ......................... F16H 48/40 |

OTHER PUBLICATIONS

"How are car wheels, hubs, axles and everything else attached to each other?," Reddit Website, Available Online at https://www.reddit.com/r/AskEngineers/comments/6k8ixi/how_are_car_wheels_hubs_axles_and_everything_else/?rdt=43710, Available as Early as Jun. 29, 2017, 4 pages.

* cited by examiner

*Primary Examiner* — Farhana Pervin

(74) *Attorney, Agent, or Firm* — McCoy Russell LLP

(57) ABSTRACT

Systems and methods for disconnecting vehicle axles from wheels are provided. In one example, a system for a wheel-end disconnect in a vehicle comprises an adapter gear having inner splines configured to mate with splines on an axle shaft of the vehicle and outer splines configured to mate with splines in a wheel hub of the vehicle; and a tow adapter configured to retain an end of the axle shaft, where the tow adapter is configured to not engage with the splines on the wheel hub and the axle shaft.

18 Claims, 6 Drawing Sheets

SYSTEMS AND METHODS FOR DISCONNECTING VEHICLE AXLES

TECHNICAL FIELD

The present disclosure relates to towing electric vehicles.

BACKGROUND AND SUMMARY

Electric and other types of vehicles may have motors and gears directly coupled to wheels. For example, a constant velocity (CV) shaft in such vehicles may be directly coupled to wheel hubs so that the motors/gears spin whenever the wheels spin. For example, electric vehicles (EVs) may not have transmissions and when the wheels spin, they may generate power to a battery.

There may be issues with towing such vehicles. For example, using a hook and chain truck, dolly, or wheel lift tow truck may leave two of an electric vehicle's wheels spinning. When an EV's wheels spin, they may continuously generate power to the battery. If that power is not being used it may damage the battery and motor, for example. In order to safely tow an electric vehicle, a flatbed tow truck or other towing system that keeps all the wheels of the vehicle off of the ground may be used. But such an approach may increase towing costs and may be more inconvenient than flat towing, where two of the wheels spin on the ground while being towed.

The inventors herein have recognized these and other issues with towing such vehicles. For example, in an event where an EV needs to be flat towed the inventors herein have recognized that it may be desirable to have disconnects in the system to allow the wheel ends to spin independently of the motors, gears, axle shafts, and differentials, so that the vehicle can be flat towed without leading to damage of the vehicle.

In order to address these and other issues, systems and methods are disclosed herein for disconnecting wheel-ends in a vehicle, e.g., an electric vehicle, so that it can be more easily towed without damaging the vehicle. In one example approach, a method for a wheel-end disconnect is provided that comprises removing an adapter gear from a wheel-end assembly, where the adapter gear comprises an inner spline configured to mate with an axle shaft and an outer spline configured to mate with a wheel hub; mounting a tow adapter on a spindle of the axle shaft, where the tow adapter is configured to retain an end of the axle shaft, where the tow adapter is not splined to the wheel hub or to the axle shaft; and securing the tow adapter to the wheel hub via a plurality of fasteners In this way electric vehicles or other vehicles that have motors and gears directly coupled to wheels may be towed with a reduced risk of damage to the vehicle and may be towed more easily and conveniently with potentially less cost, e.g., by using flat towing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
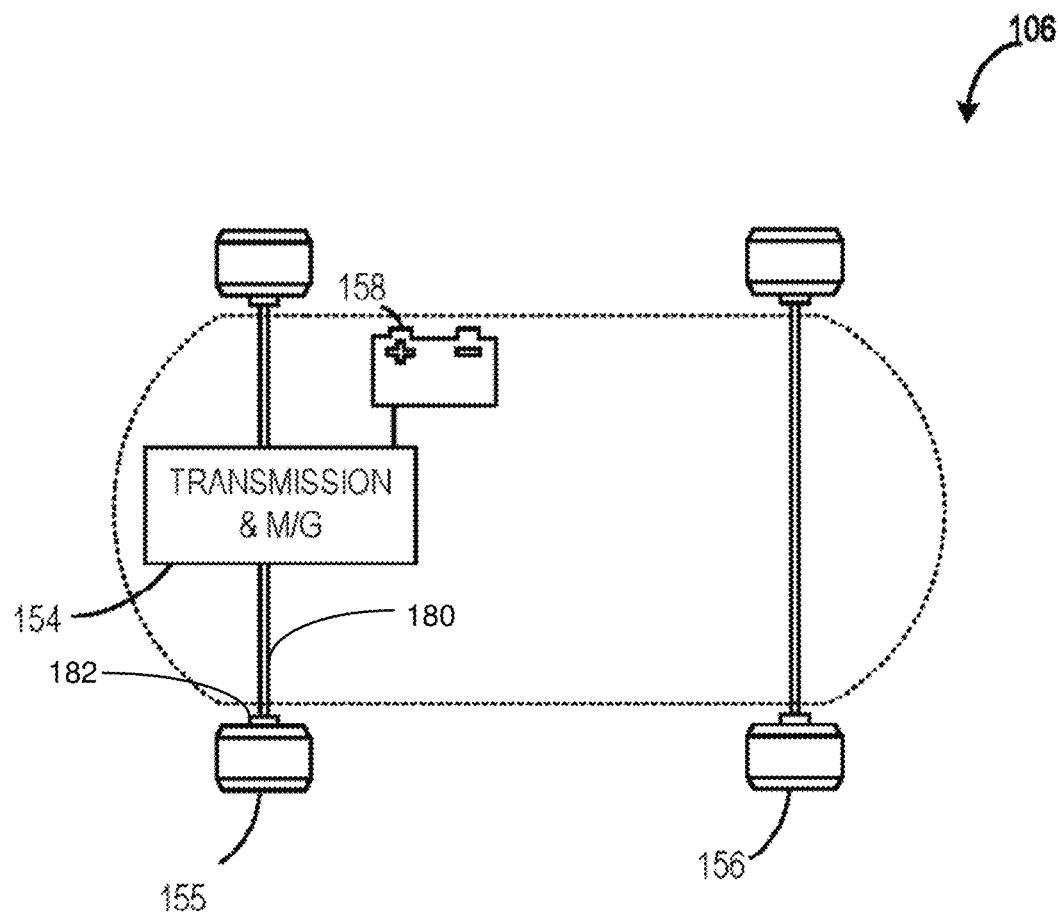
FIG. 1 shows a schematic depiction of an example vehicle in accordance with the disclosure.
Figure 1:
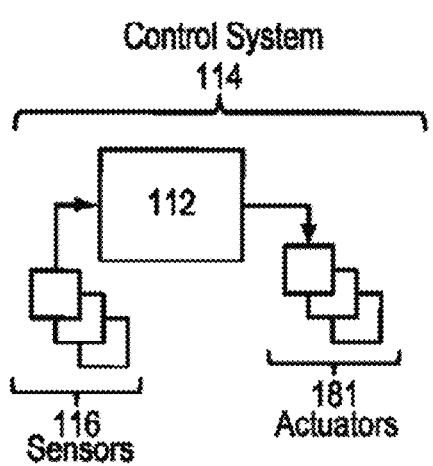

Turning now to the figures, FIG. 1 shows a schematic depiction of a vehicle system 106 that can derive propulsion power from an electric motor 154 (e.g., a drive motor). As used herein, the terms "electric vehicle" or "EV" is intended to mean any suitable vehicle that is at least partially configured to be propelled using electric power, e.g., via one or more electric motors incorporated in the vehicle. For example, vehicle system 106 may be considered to be an electric vehicle (EV). Though FIG. 1 shows a single electric motor 154, it should be understood that vehicle system 106 may include any suitable number of electric motors to propel the vehicle and/or provide power to various components and systems within system 106. In some examples, electric motor 154 may be a traction motor, however other types of electric motors are contemplated. Electric motor 154 may receive electrical power from a battery 158 to provide torque to rear vehicle wheels 155. Electric motor 154 may also be operated as a generator to provide electrical power to charge battery 158, for example, during a braking operation. It should be appreciated that while FIG. 1 depicts an electric motor 154 mounted in a rear wheel drive configuration, other configurations are possible, such as employing electric motor 154 in a front wheel configuration, or in a configuration in which there is an electric motor mounted to both the rear vehicle wheels 155 and front vehicle wheels 156. Further, additional electric motors may be included in system 106.

Electric motor 154 may include a gearbox integrated therein and/or may provide input power, together with other electric motors, to a transmission system. Additionally, or alternatively, the electric motor 154 may be coupled to an outside of a transmission/gearbox housing. The integrated gearbox may include one or more input speed reduction gear sets. Electric motor 154 may also include at least one clutch. Controller 112 may send a signal to an actuator of the clutch(es) to engage or disengage the clutch(es), so as to couple or decouple power transmission from the electric motor 154 to the rear vehicle wheels 155 or the front vehicle wheels 156. Additionally, or alternatively, there may be multiple batteries configured to provide power to different driven wheels, wherein power to the wheels may be predicated based on traction at the wheels, driver demand, and other conditions.

Vehicle system 106 may also include an axle 180, that may be rotatably coupled with a transmission and/or motor system, such as motor 154. Axle 180 may be coupled to a wheel hub 182 upon which a wheel 155 can be mounted. Axle 180 that may be coupled to various axle shafts motors, gears, differentials, etc. Vehicle system 106 may include any suitable number of axles and wheels. For example, vehicle system 106 may include a front axle positioned toward a front end of the vehicle and coupled with two wheels and a back axle positioned toward a back end of the vehicle and coupled with two wheels. Vehicle system 106 may include any suitable number of wheels, e.g., two wheels, three wheels, six wheels, eight wheels, etc. Each of the wheels of the vehicle may be coupled to a corresponding wheel hub and axle.

In some examples, the axles in vehicle system 106 may be steerable spindle style axles or constant velocity (CV) axles with CV shafts and CV joints. A CV axle may have two CV joints: an inner joint that couples to a transmission/differential, and an outer joint that couples to the wheel hub, e.g., wheel hub 182. Both of these joints may be configured to twist and turn while continuing to provide substantially constant torque to the wheel. Each joint may be encased in a heavy-duty rubber boot that flexes with the joint to keep the joints lubricated.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

As mentioned above, electric and other types of vehicles may have motors and gears directly coupled to wheels so that the motors/gears spin whenever the wheels spin. For example, electric vehicles (EVs) may not have transmissions and when the wheels spin, they may generate power to a battery. Because of this, there may be issues with towing such vehicles. For example, using a hook and chain truck, dolly, or wheel lift tow truck may leave two of an electric vehicle's wheels spinning. When an EV's wheels spin, they may continuously generate power to the battery. If that power is not being used it may damage the battery and motor, for example. In order to safely tow an electric vehicle, a flatbed tow truck or other towing system that keeps all the wheels of the vehicle off of the ground may be used. But such an approach may increase towing costs and may be more inconvenient than flat towing, where two of the wheels spin on the ground while being towed.

The inventors herein have recognized these and other issues with towing such vehicles. For example, in an event where an EV needs to be flat towed the inventors herein have recognized that it may be desirable to have disconnects in the system to allow the wheel ends to spin independently of the motors, gears, axle shafts, and differentials, so that the vehicle can be flat towed without leading to damage of the vehicle.

FIGS. 2-7 show example components and systems that provide disconnects in a vehicle system to allow the wheel ends to spin independently of the motors, gears, axle shafts, and differentials, so that the vehicle can be flat towed without leading to damage of the vehicle. In this way electric vehicles or other vehicles that have motors and gears directly coupled to wheels may be towed with a reduced risk of damage to the vehicle and may be towed more easily and conveniently with potentially less cost, e.g., by using flat towing.

Figure 2:
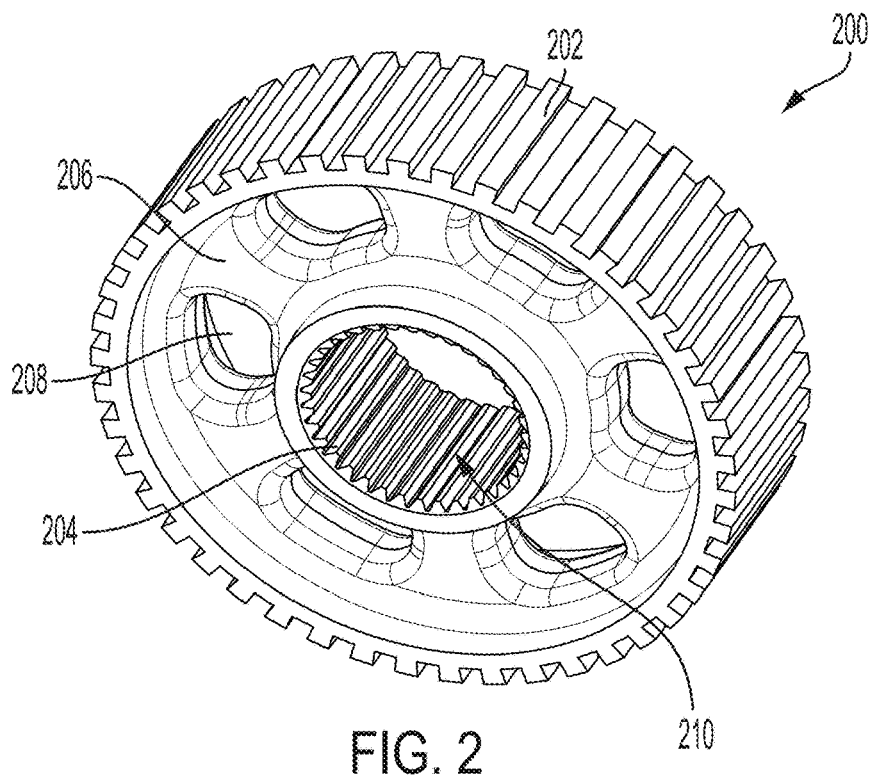
FIG. 2 shows an example adapter gear for a wheel hub in accordance with the disclosure.
Figure 3:
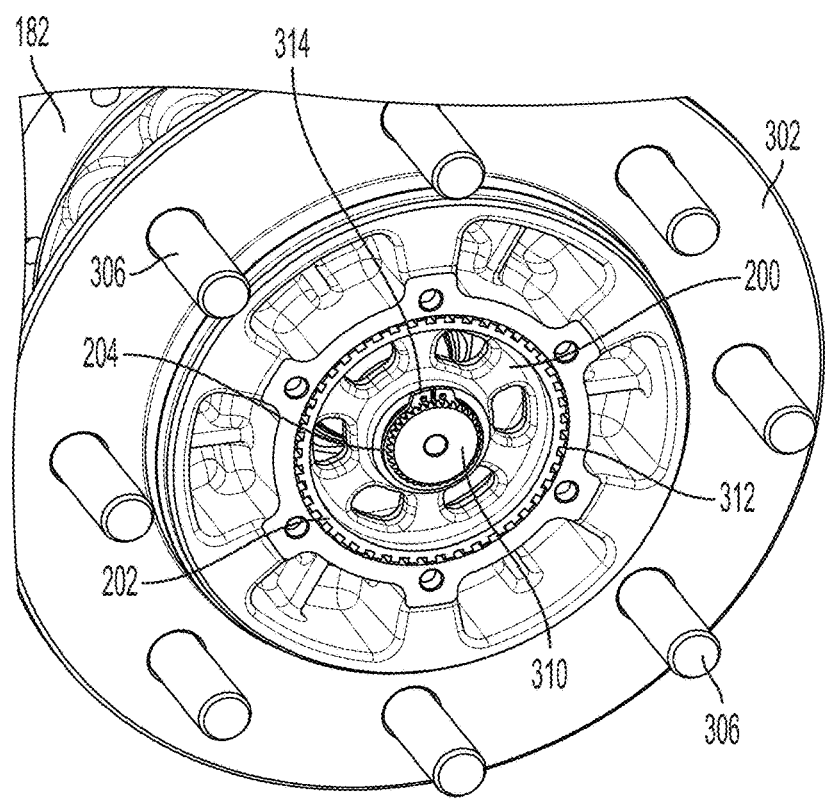
FIG. 3 shows an example adapter gear installed in a wheel hub in accordance with the disclosure.
Figure 4:
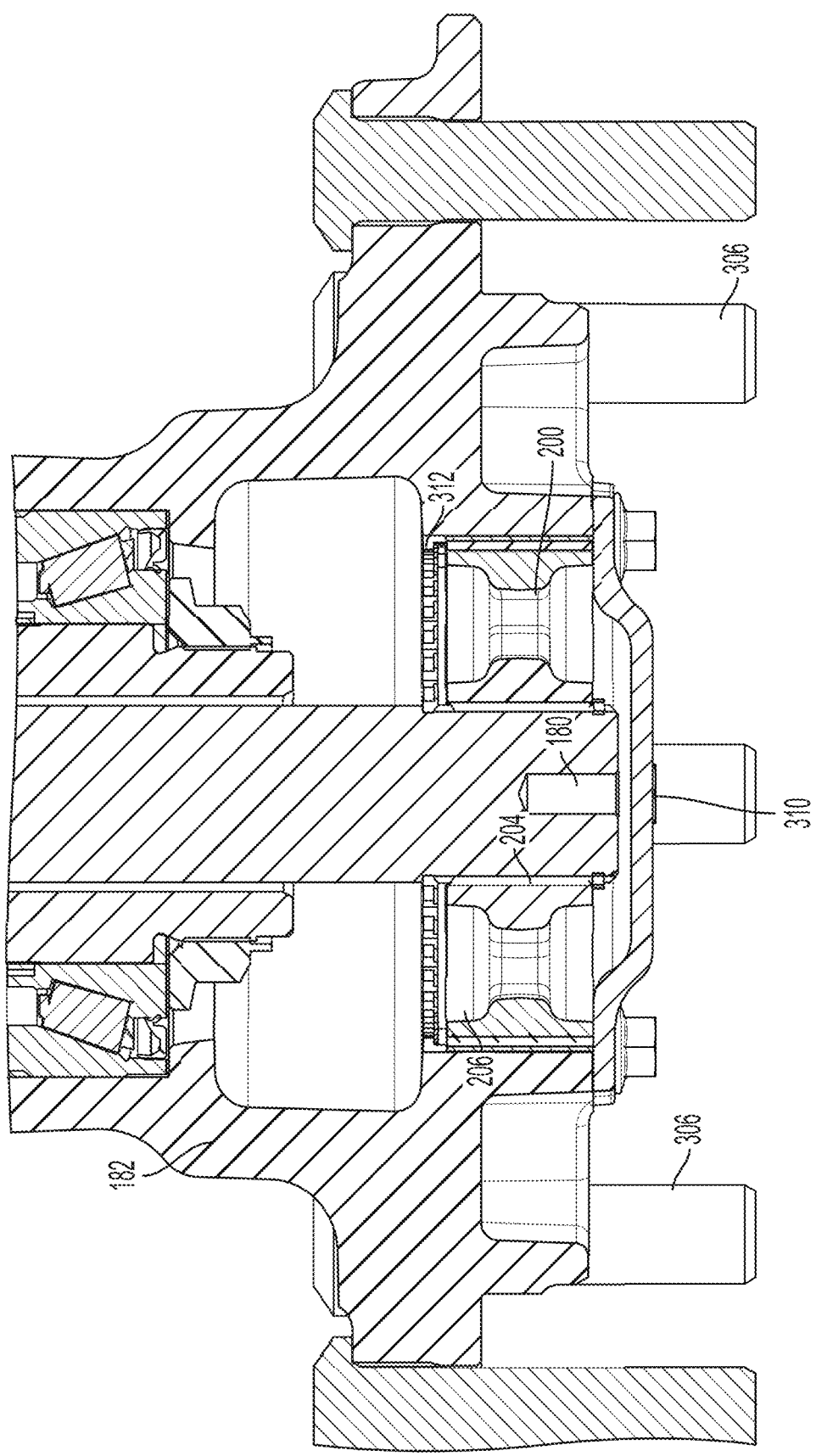
FIG. 4 shows an example wheel hub during a drive condition with an adapter gear installed.
Figure 5:
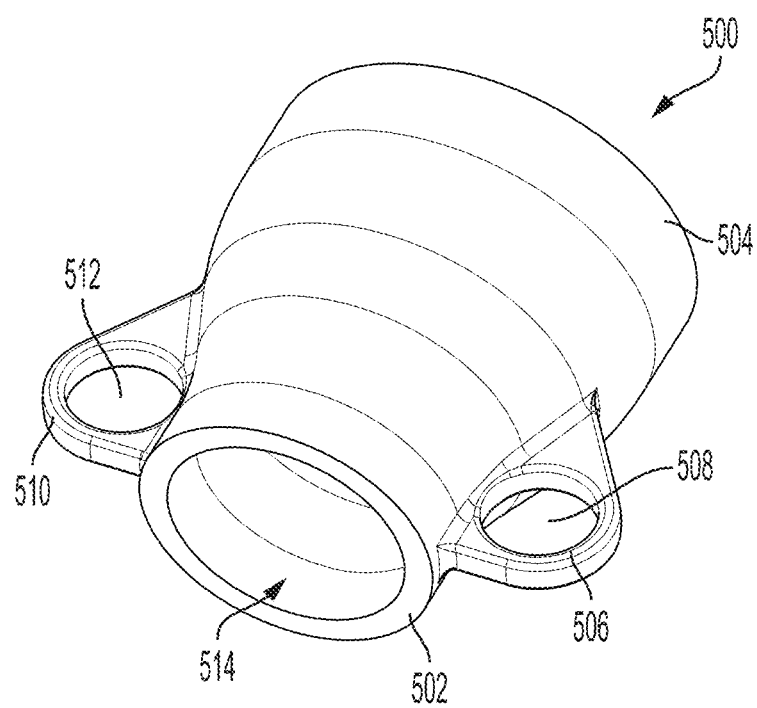
FIG. 5 shows an example tow adapter in accordance with the disclosure.

In particular, FIGS. 2-7 show example components, such as an adapter gear 200 (the terms "adapter gear" and "hub adapter" may be used interchangeably herein to mean the same thing) shown in FIG. 2 and a tow adapter 500 shown in FIG. 5. These components can be used to put the vehicle into a drive condition configuration (shown in FIGS. 2-4 described more below) and a tow condition configuration (shown in FIGS. 5-7 described more below). In the tow condition, the wheel hub 182 may be disconnected from the axles, motors, gears, differentials and the like so that a wheel attached to the wheel hub can spin without rotating those components.

FIGS. 2-4 show an example drive condition configuration where an adapter gear 200 shown in FIG. 2 is installed in a wheel hub 182 thereby connecting the axle 180 to the wheel hub 182 for a drive mode. In particular, FIG. 3 shows a wheel hub 182 with the adapter gear 200 installed and FIG. 4 shows a cross-sectional top-view of the wheel hub 182 with the adapter gear 200 installed.

The adapter gear 200 shown in FIG. 2 comprises a disc 206 with outer splines 202 positioned around an outer circumference of disc 206. Disc 206 forms an orifice 210 located in the center of adapter gear 200. Orifice 210 includes inner splines 204 positioned around the internal cylindrical surface that forms orifice 210. As used herein, the term "spline" is intended to mean a ridge or tooth that matches with a groove in a mating piece and transfers torque to it, maintaining the angular correspondence between them.

The inner splines 204 of adapter gear 200 are configured to mate with a spindle 310 of the axle, e.g., axle 180 shown in FIG. 1. The outer splines 202 of adapter gear 200 are configured to mate with wheel hub splines 312. Wheel hub splines 312 are located on an interior surface of a cylindrically shaped orifice encircling the axle spindle 310 in the wheel hub 182. Wheel hub 182 may also include a plurality of bolts 306 positioned around a rotor 302 of the wheel hub 182. The bolts 306 may be used to attach a wheel to wheel hub 182.

The adapter gear 200 couples the axle shaft, e.g., via spindle 310, to the wheel hub 182. As mentioned above, in some examples, the axle may be a CV axle that is not directly coupled to the wheel hub 182, but instead is connected by the intermediate adapter gear 200. The adapter gear 200 may be removable from the wheel hub 182. In some examples, disc 206 of adapter gear 200 may include a plurality of apertures 208 positioned at intervals around disc 206. These apertures may make adapter 200 easier to remove from wheel hub 182. For example, a tool or fingers could be inserted into some of the apertures to pull the adapter gear 200 out of the wheel hub when disconnecting the axle from the wheel hub. The apertures 208 may also make the adapter gear lighter.

In some examples, adapter gear 200 may be held in position within wheel hub 182 via a fastener 314 located at the end of axle spindle 310. In this example, in order to remove the adapter gear 200 from the wheel hub 182, fastener 314 may be removed from spindle 310.

Figure 6:
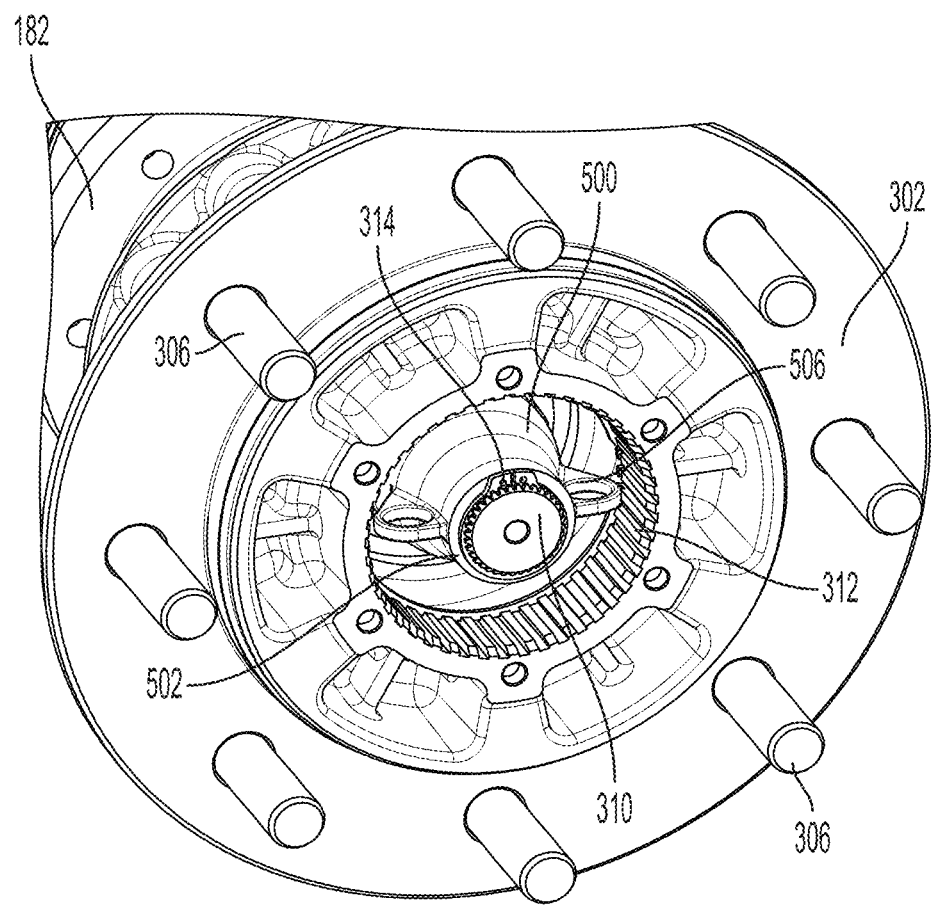
FIG. 6 shows an example tow adapter installed in a wheel hub in accordance with the disclosure.
Figure 7:
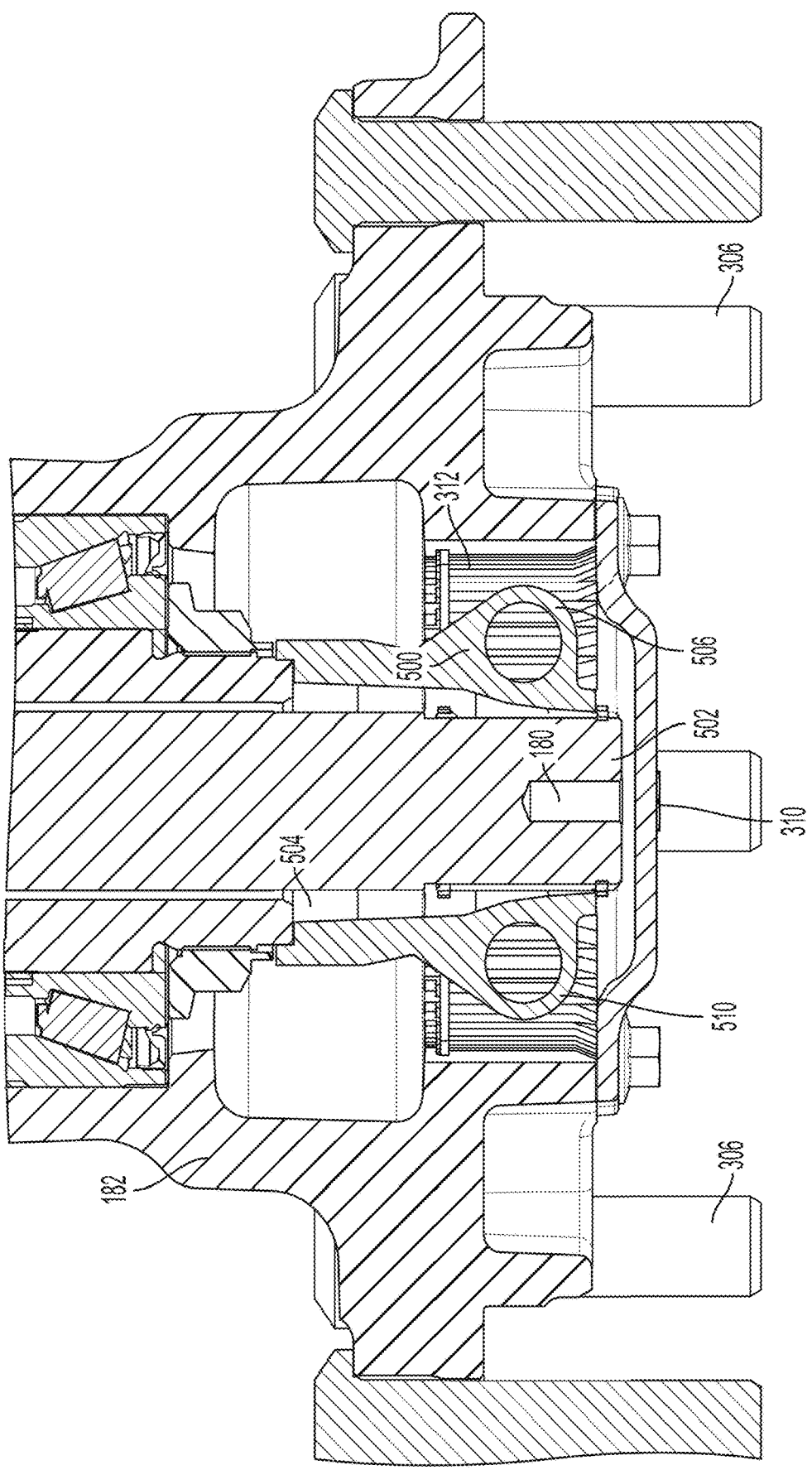
FIG. 7 shows an example wheel hub during a tow condition with an example tow adapter installed.

FIGS. 5-7 show an example tow condition configuration where a tow adapter 500 shown in FIG. 5 is installed in a wheel hub 182 thereby disconnecting the axle 180 from the wheel hub 182. In particular, FIG. 6 shows a wheel hub 182 with the tow adapter 500 installed and FIG. 7 shows a cross-sectional top-view of the wheel hub 182 with the tow adapter 500 installed. Like numbers shown in FIGS. 5-7 correspond to like numbers shown in FIGS. 2-4 described above.

The tow adapter 500 shown in FIG. 5 comprises a tapered cylindrical body having a first end 502 and a second opposing end 504. A diameter of the first end 502 may be less than a diameter of the second end 504. In some examples, a diameter of the tow adapter 500 may be monotonically decreasing in a direction from the second end 504 to the first end 502 to form the tapered cylindrical body of the tow adapter 500. The tapered cylindrical body of the tow adapter 500 may form an orifice 514 extending all the way through the tow adapter in a direction from the first end 502 to the second end 504.

The tow adapter 500 may also include tabs 506 and 510 located near the smaller diameter end 502 of the tow adapter 500. Each tab may have an aperture extending therethrough. For example, as shown in FIG. 5, tab 506 has aperture 508 and tab 510 has aperture 512. The tabs may be used for inserting and/or removing the tow adapter 500 in/from the wheel hub 182. For example, a tool or fingers may be inserted into the apertures of the tabs to push the tow adapter into position in the wheel hub 182 and/or to pull the tow adapter out of its position in the wheel hub 182.

The tow adapter 500 may be installed in the interior surface of the cylindrically shaped orifice encircling the axle spindle 310 in the wheel hub 182 in a similar position where the adapter gear 200 was installed before removal to install the tow adapter. However, unlike the adapter gear, the tow adapter does not engage or mate with any of the splines on the wheel hub 182 or spindle 310. Instead the spindle 310 sits within orifice 514 of tow adapter 500 without engaging any components of the tow adapter, so that the spindle 310 can spin freely without engaging the wheel hub 182 or turning any wheel attached to it. The larger diameter end 504 of the tow adapter sits within the cylindrically shaped orifice encircling the axle spindle 310 without engaging any wheel hub splines.

Thus, when installed, the tow adapter 500 may provide axle shaft retention to retain the axle shaft with respect to a rotating wheel end, for example. Additionally, when installed, the tow adapter 500 may guide the end of the shaft, e.g., spindle 310, to maintain clearance to the rotating wheel hub since the tow adapter is not splined to the wheel hub or to the axle shaft.

In some examples, one or more fasteners may be used to secure the tow adapter in position. For example, fastener 314 located at the end of axle spindle 310 may be used to retain the tow adapter 500 in position on the wheel hub 182. In some examples, faster 314 may be the same faster used to secure the adapter gear 200 in position. However, in other examples, different fasteners may be used to secure the tow adapter in the wheel hub.

The tow adapter 500 may be made of any suitable rigid material. For example, tow adapter 500 may be made of a metal or plastic and may be rigid so that it does not substantially flex when pressed. In some examples, tow adapter 500 may be a molded component, e.g., formed by an injection molding process. However, in other examples, tow adapter 500 may be milled or formed by some other process.

Figure 8:
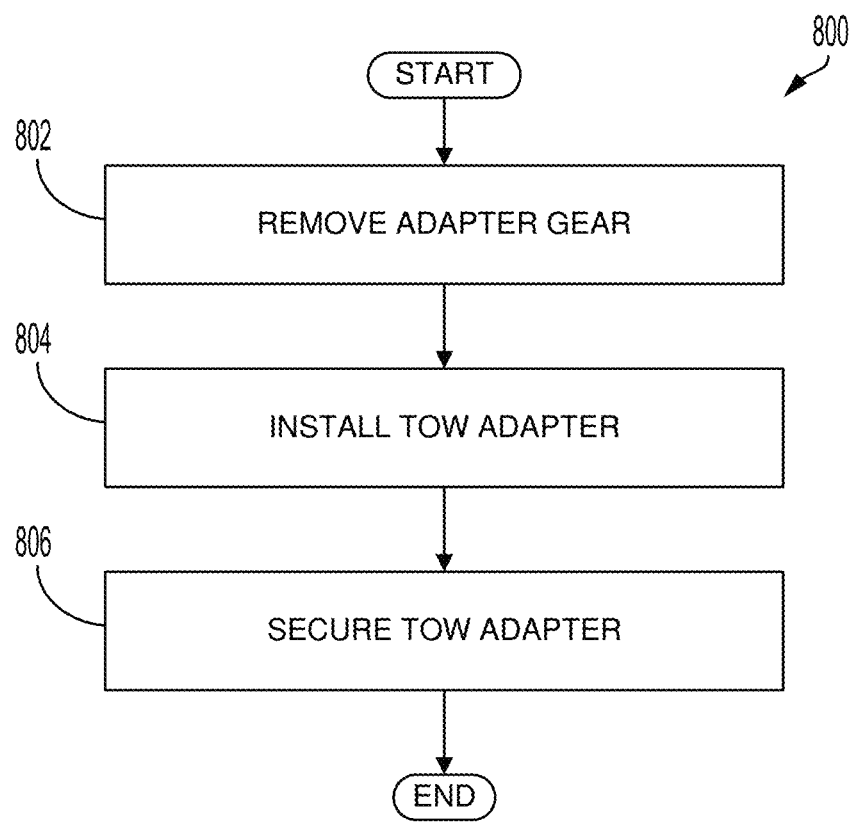
FIG. 8 shows an example method for preparing a vehicle for towing in accordance with the disclosure.

FIG. 8 shows an example method 800 for preparing an electric vehicle for towing by disconnecting the axle 180 from the wheel hub 182. At 802, method 800 includes removing an adapter gear, such as adapter gear 200, from the wheel hub. In some examples, any wheel installed on the wheel hub may be removed and one or more fasteners may be removed from an outer cover of the wheel hub to remove the cover if there is one. Any fasteners holding the adapter gear 200 in place within the wheel hub may then be removed. For example, fastener 314 may be removed so that the adapter gear can be removed from the wheel hub. As remarked above, the adapter gear may comprise an inner spline configured to mate with an axle shaft and an outer spline configured to mate with a wheel hub and removing it will disconnect those connections.

At 804, method 800 includes installing a tow adapter. For example, tow adapter 500 may be inserted into the wheel hub to uncouple the axle shaft from the wheel hub. As remarked above, the tow adapter may be configured to retain an end of the axle shaft, where the tow adapter is not splined to the wheel hub or to the axle shaft.

At 806, method 800 includes securing the tow adapter. For example, once the tow adapter is installed, the fastener, e.g., fastener 314, to the axle shaft will be reinstalled, as well as the dust cover if there is one. Once completed the vehicle can be flat towed, as the hubs have been disconnected from motor/gears and differential.

Various non-limiting embodiments are also described in the following. In some examples, a system for a wheel-end disconnect in a vehicle may comprise an adapter gear having inner splines configured to mate with splines on an axle shaft of the vehicle and outer splines configured to mate with splines in a wheel hub of the vehicle; and a tow adapter configured to retain an end of the axle shaft, where the tow adapter is configured to not engage with the splines on the wheel hub and the axle shaft.

In some examples, the vehicle may be an electric vehicle. The system may further comprise a fastener on the end of a spindle of the axle shaft, wherein the fastener may be configured to retain the adapter gear and the tow adapter in the wheel hub. In some examples, the splines on the wheel hub may be located on an interior surface of a cylindrically shaped orifice encircling a spindle of the axle shaft. In some examples, the axle shaft may be a constant velocity shaft.

In some examples, the adapter gear may comprise a disc with the outer splines positioned around an outer circumference of the disc. In some examples, the disc may form an orifice located in the center of the adapter gear, and the orifice may include the inner splines positioned around an internal cylindrical surface that forms the orifice. In some examples, the disc may include a plurality of apertures. The plurality of apertures may be positioned at intervals around the disc.

In some examples, the tow adapter may comprise a tapered cylindrical body. A diameter of a first end of the tapered cylindrical body may be less than a diameter of a second end of the tapered cylindrical body. The tapered cylindrical body may form an orifice extending all the way through the tow adapter in a direction from the first end to the second end. In some examples, the tow adapter may further comprise two tabs extending from the tapered cylindrical body. The two tabs each may include an aperture extending therethrough.

Methods for a wheel-end disconnect are also provided and may comprise: removing an adapter gear from a wheel-end assembly, where the adapter gear comprises an inner spline configured to mate with an axle shaft and an outer spline configured to mate with a wheel hub; mounting a tow adapter on a spindle of the axle shaft, where the tow adapter is configured to retain an end of the axle shaft, where the tow adapter is not splined to the wheel hub or to the axle shaft. In some examples, methods may further comprise securing the tow adapter to the wheel hub via one or more fasteners. In some examples, methods may further comprise removing a fastener on the spindle, where the fastener is configured to retain the adapter gear on the wheel-end assembly, and reinstalling the fastener on the spindle after mounting the tow adapter on the spindle.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a wheel-end disconnect in a vehicle, comprising:
 an adapter gear having inner splines configured to mate with splines on an axle shaft of the vehicle and outer splines configured to mate with splines in a wheel hub of the vehicle; and
 a tow adapter configured to retain an end of the axle shaft, wherein the tow adapter is configured to not engage with the splines on the wheel hub and the axle shaft, and the tow adapter comprising a tapered cylindrical body.

2. The system of claim 1, wherein the vehicle is an electric vehicle.

3. The system of claim 1, further comprising: a fastener on the end of a spindle of the axle shaft, wherein the fastener is configured to retain the adapter gear and the tow adapter in the wheel hub.

4. The system of claim 1, wherein the splines on the wheel hub are located on an interior surface of a cylindrically shaped orifice encircling a spindle of the axle shaft.

5. The system of claim 1, wherein the axle shaft is a constant velocity shaft.

6. The system of claim 1, wherein the adapter gear comprises a disc with the outer splines positioned around an outer circumference of the disc.

7. The system of claim 6, wherein the disc forms an orifice located in the center of the adapter gear, and the orifice includes the inner splines positioned around an internal cylindrical surface that forms the orifice.

8. The system of claim 7, wherein the disc includes a plurality of apertures.

9. The system of claim 8, wherein the plurality of apertures are positioned at intervals around the disc.

10. The system of claim 1, wherein a diameter of a first end of the tapered cylindrical body is less than a diameter of a second end of the tapered cylindrical body.

11. The system of claim 10, wherein the tapered cylindrical body forms an orifice extending all the way through the tow adapter in a direction from the first end to the second end.

12. The system of claim 1, wherein the tow adapter further comprises two tabs extending from the tapered cylindrical body.

13. The system of claim 12, wherein the two tabs each include an aperture extending therethrough.

14. A system for a wheel-end disconnect in an electric vehicle, comprising:
an adapter gear having inner splines configured to mate with splines on an axle shaft of the vehicle and outer splines configured to mate with splines in a wheel hub of the vehicle;
a tow adapter configured to retain an end of the axle shaft, wherein the tow adapter is configured to not engage with the splines on the wheel hub and the axle shaft, wherein the tow adapter comprises a tapered cylindrical body, wherein a diameter of a first end of the tapered cylindrical body is less than a diameter of a second end of the tapered cylindrical body, and wherein the tapered cylindrical body forms an orifice extending all the way through the tow adapter in a direction from the first end to the second end; and
a fastener on the end of a spindle of the axle shaft, wherein the fastener is configured to retain the adapter gear and the tow adapter in the wheel hub.

15. The system of claim 14, wherein the adapter gear comprises a disc with the outer splines positioned around an outer circumference of the disc and wherein the disc forms an orifice located in the center of the adapter gear, and the orifice includes the inner splines positioned around an internal cylindrical surface that forms the orifice.

16. A method for a wheel-end disconnect, comprising:
removing an adapter gear from a wheel-end assembly, wherein the adapter gear comprises an inner spline configured to mate with an axle shaft and an outer spline configured to mate with a wheel hub;
mounting a tow adapter on a spindle of the axle shaft, wherein the tow adapter is configured to retain an end of the axle shaft, wherein the tow adapter is not splined to the wheel hub or to the axle shaft, wherein the tow adapter comprises a tapered cylindrical body, and wherein a diameter of a first end of the tapered cylindrical body is less than a diameter of a second end of the tapered cylindrical body.

17. The method of claim 16, further comprising: securing the tow adapter to the wheel hub via one or more fasteners.

18. The method of claim 16, further comprising: removing a fastener on the spindle, wherein the fastener is configured to retain the adapter gear on the wheel-end assembly, and reinstall the fastener on the spindle after mounting the tow adapter on the spindle.

* * * * *